United States Patent
Larssen et al.

(10) Patent No.: US 12,074,351 B2
(45) Date of Patent: Aug. 27, 2024

(54) REFUELLING UNIT FOR REFUELLING FUEL CELL OF HEARING AID

(71) Applicant: WIDEX A/S, Lynge (DK)

(72) Inventors: Michael Frydendal Larssen, Veksoe (DK); Per Kokholm Sorensen, Virum (DK); Thorvaldur Oli Bodvarsson, Copenhagen S (IS); Boris Valnert, Copenhagen V (DK)

(73) Assignee: WIDEX A/S, Lynge (DK)

(*) Notice: Subject to any disclaimer, the term of this patent is extended or adjusted under 35 U.S.C. 154(b) by 912 days.

(21) Appl. No.: 17/257,420

(22) PCT Filed: Jul. 4, 2019

(86) PCT No.: PCT/EP2019/067976
§ 371 (c)(1),
(2) Date: Dec. 31, 2020

(87) PCT Pub. No.: WO2020/007972
PCT Pub. Date: Jan. 9, 2020

(65) Prior Publication Data
US 2021/0280882 A1  Sep. 9, 2021

Related U.S. Application Data

(60) Provisional application No. 62/694,629, filed on Jul. 6, 2018.

(30) Foreign Application Priority Data

Jul. 4, 2018  (DK) .......................... PA 2018 00325

(51) Int. Cl.
*H01M 8/04082*  (2016.01)
*H01M 8/1011*  (2016.01)
*H04R 25/00*  (2006.01)

(52) U.S. Cl.
CPC ..... *H01M 8/04208* (2013.01); *H01M 8/1011* (2013.01); *H04R 25/602* (2013.01); *H01M 2250/30* (2013.01)

(58) Field of Classification Search
CPC ........... H01M 8/04208; H01M 8/1011; H01M 2250/30; H01M 8/04201; H04R 25/602; Y02B 90/10; Y02E 60/50
See application file for complete search history.

(56) References Cited

U.S. PATENT DOCUMENTS

2004/0209142 A1* 10/2004 Becerra ............ H01M 8/04753
                                                         429/513
2005/0130009 A1   6/2005 Hasegawa et al.
(Continued)

FOREIGN PATENT DOCUMENTS

DE   10 2010 027 881 A1   10/2011
EP   0 995 944 A2          4/2000
EP   1 432 286 A2          6/2004

OTHER PUBLICATIONS

Danish Patent Office search opinion for PA 2018 00325 dated Feb. 28, 2019.
(Continued)

*Primary Examiner* — Ula C Ruddock
*Assistant Examiner* — Sarika Gupta
(74) *Attorney, Agent, or Firm* — Sughrue Mion, PLLC

(57) ABSTRACT

Disclosed is a refueling unit for refueling a fuel cell. The refueling unit comprising a fuel cell receiving section and a cartridge receiving section. The refuelling unit is configured to receive through a waste inlet a waste fluid. The refuelling unit further comprises an intermediate fuel reservoir for storing fuel. The refuelling unit is configured to firstly receive in the intermediate fuel reservoir a predetermined amount of fuel from a cartridge and secondly empty the
(Continued)

intermediate fuel reservoir and guide said fuel stored therein into the fuel reservoir of a fuel cell connected to the fuel cell receiving section.

12 Claims, 3 Drawing Sheets

(56) References Cited

U.S. PATENT DOCUMENTS

| | | |
|---|---|---|
| 2006/0027576 A1 | 2/2006 | Yokozawa |
| 2006/0029839 A1* | 2/2006 | Takei ................. B01J 20/24 |
| | | 429/479 |
| 2006/0115702 A1 | 6/2006 | Kang |
| 2007/0068599 A1 | 3/2007 | Iaconis et al. |
| 2007/0084879 A1 | 4/2007 | McLean et al. |
| 2008/0107924 A1 | 5/2008 | Wang et al. |

OTHER PUBLICATIONS

Danish Patent Office search report for PA 2018 00325 dated Feb. 22, 2019.
International Search Report for PCT/EP2019/067976 dated Oct. 14, 2019.
Written Opinion for PCT/EP2019/067976 dated Oct. 14, 2019.

* cited by examiner

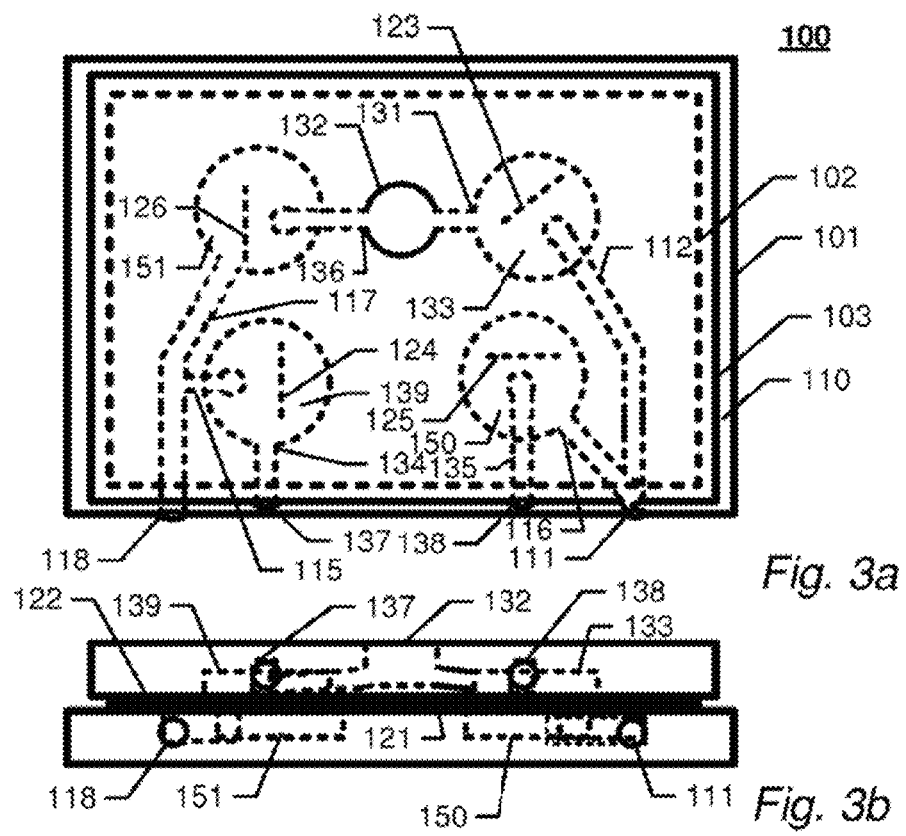
Fig. 3a
Fig. 3b
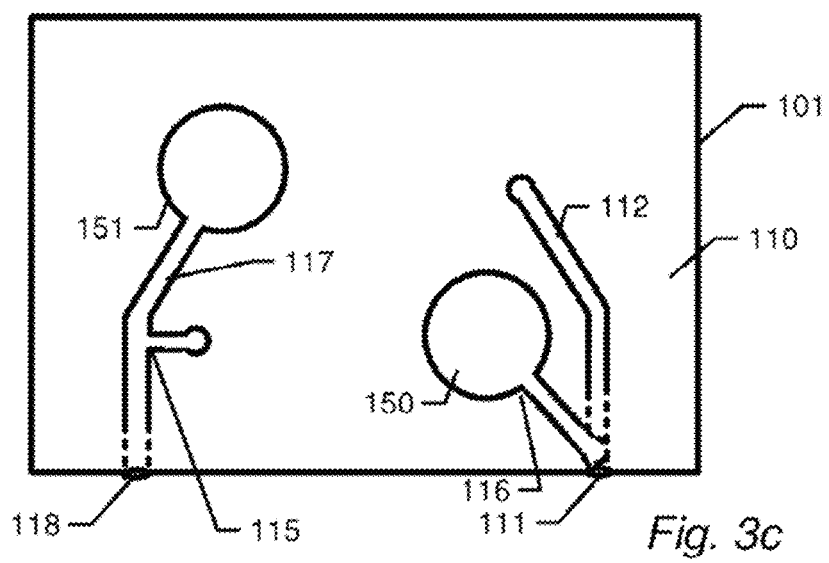
Fig. 3c

US 12,074,351 B2

REFUELLING UNIT FOR REFUELLING FUEL CELL OF HEARING AID

CROSS-REFERENCE TO RELATED APPLICATIONS

This application is a National Stage of International Application No. PCT/EP2019/067976 filed Jul. 4, 2019, which claims priority under U.S.C. § 119(a) to Danish Patent Application No. PA 2018 00325 filed on Jul. 4, 2018 and U.S. patent application Ser. No. 62/694,629 filed Jul. 6, 2018.

FIELD

The present invention relates to a refuelling unit for refuelling a fuel cell and a system comprising a refuelling unit and a hearing aid.

BACKGROUND

Hearing aids have become more and more advanced over the years. This is partly a result of new hardware and development of new algorithms. This has greatly improved the experience of the users. One of the traditional bottlenecks of hearing aid design is the power consumption. Most modern hearing aids use single use batteries such Zn air batteries.

Fuel cells such as direct Methanol fuel cells have been suggested as an alternative power source for hearing aids. One advantage of using fuel cells is that refuelling operations may be conducted fast e.g. in less than a minute.

US2007068599 discloses an apparatus for fuelling a fuel-cell-powered device having a profile and a fuel inlet. The apparatus comprises at least one fuel port having an outlet and at least one adaptor associated with the fuel port. The adaptor is configured to receive the fuel-cell-powered device. Means for releasably and sealingly engaging the fuel inlet of the fuel-cell-powered device to the outlet of the fuel port are also provided.

It remains however a problem to provide a refuelling unit capable of handling the small amount of fuel needed for a small fuel cell such as a fuel cell powering a hearing aid.

SUMMARY

According to a first aspect, the invention relates to a refueling unit for refueling a fuel cell, said refueling unit comprising
  a fuel cell receiving section having a fuel outlet adapted for being fluidly connected to a fuel inlet of a fuel reservoir of a fuel cell, and waste inlet adapted for being fluidly connected to a waste outlet of said fuel reservoir of said fuel cell;
  a cartridge receiving section having a fuel inlet adapted for being fluidly connected with a fuel outlet of a cartridge comprising a fuel for refuelling said fuel cell;
  wherein said refuelling unit is configured to receive through said waste inlet a waste fluid stored in a fuel reservoir of a fuel cell connected to said fuel cell receiving section, wherein said refuelling unit further comprises an intermediate fuel reservoir for storing fuel, said intermediate fuel reservoir being fluidly connected to said fuel inlet of said cartridge receiving section and said fuel outlet of said fuel cell receiving section, wherein said refuelling unit is configured to firstly receive in said intermediate fuel reservoir a predetermined amount of fuel from a cartridge connected to said cartridge receiving section and secondly empty said intermediate fuel reservoir and guide said fuel stored therein out of said fuel outlet of said fuel cell receiving section and into the fuel reservoir of a fuel cell connected to said fuel cell receiving section.

Consequently, a simple refuelling unit capable of providing a precise amount of new fuel into the fuel reservoir is provided.

The fuel may be methanol i.e. the fuel cell may be a direct methanol fuel cell. The waste fluid may be residual methanol stored in the fuel reservoir of the fuel cell. The intermediate fuel reservoir may contain between 0.01 ml and 5 ml, between 0.05 ml and 2 ml, or between 0.01 ml and 0.5 ml. The fuel outlet and the fuel inlet of the fuel cell receiving section may be two different fluid connection ports or they may be combined into a single inlet/outlet fluid connection port. The cartridge may contain an amount of fuel for at least 5 refuelling operations, at least 10 refuelling operations or at least 20 refuelling operations. The refuelling unit may comprise one or more pumps configured to pump fuel into the intermediate fuel reservoir and out of the fuel outlet of the fuel cell receiving section.

In some embodiments said refueling unit further comprises a first piston and an actuator, wherein said first piston is configured to be movable in said intermediate fuel reservoir between a first position and a second position, said refuelling unit being configured to receive in said intermediate fuel reservoir a predetermined amount of fuel from a cartridge connected to said cartridge receiving section by moving said first piston from said first position to said second position using said actuator, and secondly empty said intermediate fuel reservoir and guide said fuel stored therein out of said fuel outlet of said fuel cell receiving section by moving said first piston from said second position to said first position using said actuator.

Consequently, the intermediate fuel reservoir may in a simple manner be provided with a predetermined amount of fuel.

The refuelling unit may comprise a control unit configured to control the actuator. The control unit may detect (manually or automatically) when a fuel cell is received at the fuel cell receiving section and send control signals to the actuator.

In some embodiments said intermediate fuel reservoir is fluidly connected to said fuel inlet of said cartridge receiving section via a one-way valve allowing fluid flow only from said fuel inlet of said cartridge receiving section to said intermediate fuel reservoir.

In some embodiments said intermediate fuel reservoir is fluidly connected to said fuel outlet of said fuel cell receiving section via a one-way valve allowing fluid flow only from said intermediate fuel reservoir to said fuel outlet of said fuel cell receiving section.

In some embodiments said refueling unit further comprises an intermediate waste reservoir and a waste outlet, said intermediate waste reservoir being fluidly connected to said waste inlet of said fuel cell receiving section and said waste outlet, said refueling unit being configured to receive a waste fluid through said waste inlet from a fuel reservoir of a fuel cell connected to said fuel cell receiving section by firstly receiving in said intermediate waste reservoir said waste fluid and secondly empty said intermediate waste reservoir and guide said waste fluid stored therein out of said waste outlet.

In some embodiments said refueling unit further comprises a second piston, wherein said second piston is configured to be movable in said intermediate waste reservoir between a first position and a second position, said refuelling unit being configured to receive in said intermediate waste reservoir a waste fluid from a fuel reservoir of a fuel cell connected to said fuel cell receiving section by moving said second piston from said first position to said second position, and secondly empty said intermediate waste reservoir and guide said waste fluid stored therein out of said waste outlet by moving said second piston from said second position to said first position.

The amount of waste fluid stored in the fuel reservoir of the fuel cell may vary. Thus, the fuel reservoir of the fuel cell or the refuelling unit may be provided with an under pressure valve configured to open and allow an auxiliary fluid e.g. atmospheric air, to enter the intermediate waste reservoir if the vacuum in the intermediate waste reservoir exceeds a particular value.

In some embodiments said intermediate waste reservoir is fluidly connected to said waste inlet of said fuel cell receiving section via a one-way valve allowing fluid flow only from said waste inlet to said intermediate waste reservoir.

In some embodiments said intermediate waste reservoir is fluidly connected to said waste outlet via a one-way valve allowing only fluid flow from said intermediate waste reservoir to said waste outlet.

In some embodiments said actuator is configured to move said second piston from said first position to said second position, and from said second position to said first position.

In some embodiments said first piston is mechanically coupled to said second piston via a force transferring element so that said first piston and said second piston simultaneously move from the first position to the second position and from the second position to the first position, whereby the intermediate fuel reservoir is filed with fuel at the same as the intermediate waste reservoir receives waste fluid, and the fuel stored in the intermediate fuel reservoir is guided out of said intermediate fuel reservoir at the same time as the waste fluid is guided out of said intermediate waste reservoir.

Consequently, a fast and simple refueling unit is provided.

In some embodiments said fuel outlet and said waste inlet of said fuel cell receiving section are combined into a single inlet/outlet fluid connection port for being fluidly connected to a combined inlet/outlet fluid connection port of a fuel reservoir of a fuel cell.

Consequently, by having a combined single inlet/outlet fluid connection port less space is required on the fuel reservoir of the fuel cell for providing the connection to the refueling unit.

According to a second aspect the invention relates to a system comprising a refuelling unit as disclosed in relation to the first aspect of the invention and a hearing aid fitted with a fuel cell having a fuel reservoir with a single combined inlet/outlet fluid connection port connectable to the fuel cell receiving section of the refueling unit.

In some embodiment the system further comprises a cartridge connectable to the cartridge receiving section of the refueling unit.

According to a third aspect the invention relates to a method of refueling a fuel cell using a refueling unit as disclosed in relation to the first aspect of the invention, comprising the steps of:

arranging a cartridge in said cartridge receiving section of said refueling unit;
arranging a fuel cell having a fuel reservoir in said fuel cell receiving section, said fuel cell forming part of a hearing aid;
receiving in said refueling unit a waste fluid stored in the fuel reservoir of said fuel cell;
receiving in said intermediate fuel reservoir a predetermined amount of fuel from said cartridge connected to said cartridge receiving section;
emptying said intermediate fuel reservoir and guiding said fuel stored therein out of said fuel outlet of said fuel cell receiving section and into the fuel reservoir of said fuel cell connected to said fuel cell receiving section.

The different aspects of the present invention can be implemented in different ways including as refuelling units and systems comprising such refuelling units described above and in the following, each yielding one or more of the benefits and advantages described in connection with at least one of the aspects described above, and each having one or more preferred embodiments corresponding to the preferred embodiments described in connection with at least one of the aspects described above and/or disclosed in the dependant claims. Furthermore, it will be appreciated that embodiments described in connection with one of the aspects described herein may equally be applied to the other aspects.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein:

FIGS. 3*a-e* show a fluid system 100 according to an embodiment of the present invention.

DETAILED DESCRIPTION

In the following description, reference is made to the accompanying figures, which show by way of illustration how the invention may be practiced.

Figure 1:
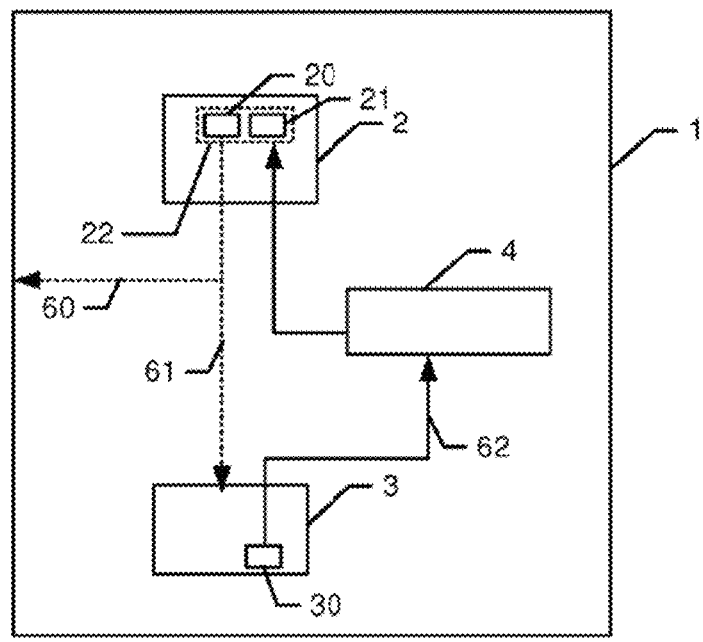
FIG. 1 shows a schematic drawing of a refuelling unit according to an embodiment of the present invention.

FIG. 1 shows a schematic drawing of a refuelling unit 1 for refuelling a fuel cell according to an embodiment of the present invention. The refueling unit 1 comprises a fuel cell receiving section 2, a cartridge receiving section 3 and an intermediate fuel reservoir 4. The fuel cell receiving section 2 has a fuel outlet 21 for being fluidly connected to a fuel inlet of a fuel reservoir of a fuel cell and waste inlet 22 for being fluidly connected to a waste outlet of the fuel reservoir of the fuel cell. The cartridge receiving section 3 has a fuel inlet 30 for being fluidly connected with a fuel outlet of a cartridge comprising a fuel for refuelling the fuel cell. The refuelling unit 1 is configured to receive through the waste inlet 20 a waste fluid stored in a fuel reservoir of a fuel cell connected to the fuel cell receiving section 2. The waste fluid may be guided 60 out of the refuelling unit 1 or guided 61 into the cartridge receiving section 3 for providing the waste fluid to a cartridge. The intermediate fuel reservoir 4 is fluidly connected to the fuel inlet 30 of said cartridge receiving section 3 and the fuel outlet 21 of said fuel cell receiving section 2. The refuelling unit is configured to firstly receive in the intermediate fuel reservoir 4 a predetermined amount of fuel from a cartridge connected to the cartridge receiving section 3 and secondly empty the intermediate fuel reservoir 4 and guide the fuel stored therein out of the fuel outlet 21 of the fuel cell receiving section 2 and into the fuel reservoir of a fuel cell connected to the fuel cell receiving section 2. The fuel outlet 21 and the waste inlet 20 of the fuel cell receiving section 2 may be combined into a single inlet/outlet fluid connection port 22 for being fluidly connected to a combined inlet/outlet fluid connection port of a fuel reservoir of a fuel cell.

Figure 2:
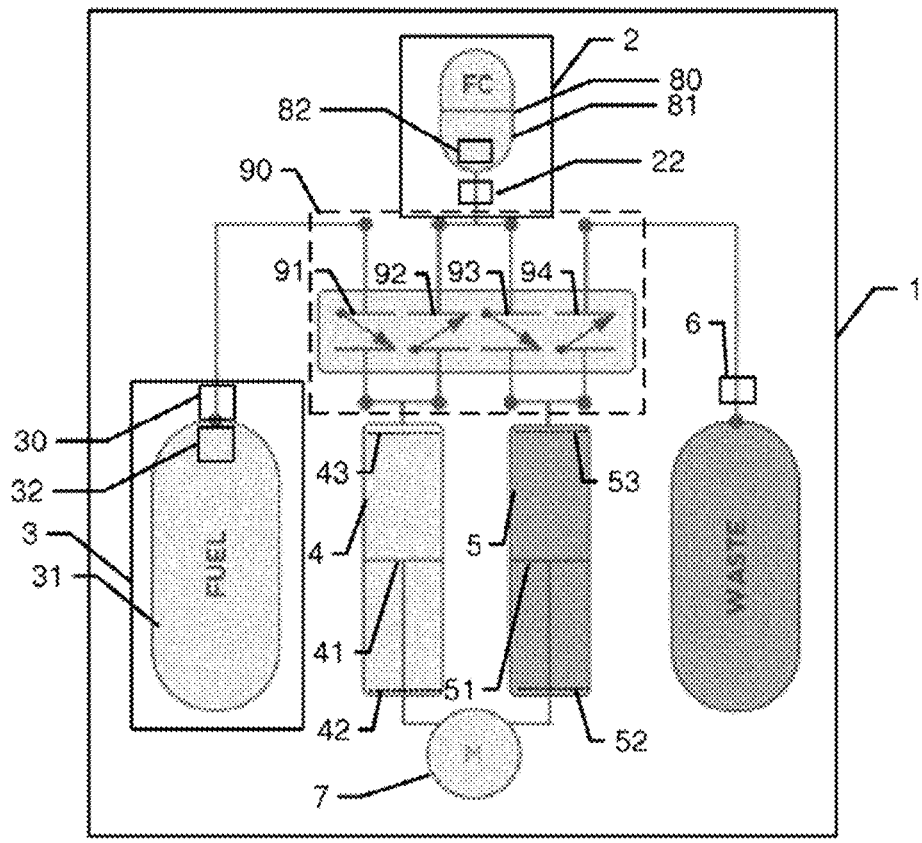
FIG. 2 shows a schematic drawing of a refuelling unit according to an embodiment of the present invention.

FIG. 2 shows a schematic drawing of a refuelling unit 1 for refuelling a fuel cell according to an embodiment of the present invention. The refueling unit 1 comprises a fuel cell receiving section 2, a cartridge receiving section 3, an intermediate fuel reservoir 4, an intermediate waste reservoir 5 and a waste outlet 6. The fuel cell receiving section 2 has an inlet/outlet fluid connection port 22. A fuel cell 80 e.g. of a hearing aid, is connected to the fuel cell receiving section 2. The inlet/outlet fluid connection port 22 is connected to an inlet/outlet port 82 of a fuel reservoir 81 of the fuel cell 80. A cartridge 31 comprising a fuel for refuelling the fuel cell 80 is connected to the cartridge receiving section 3. The cartridge receiving section 3 has a fuel inlet 30 connected to a fuel outlet 32 of the cartridge 31.

The intermediate fuel reservoir 4 is fluidly connected to the fuel inlet 30 of the cartridge receiving section 3 via a one-way valve 91 allowing fluid flow only from the fuel inlet 30 of said cartridge receiving section 3 to the intermediate fuel reservoir 4. The intermediate fuel reservoir 4 is fluidly connected to the inlet/outlet fluid connection port 22 via a one-way valve 92 allowing fluid flow only from the intermediate fuel reservoir 4 to the inlet/outlet fluid connection port 22 of the fuel cell receiving section 2.

The intermediate waste reservoir 5 is fluidly connected to inlet/outlet fluid connection port 22 via a one-way valve 93 allowing fluid flow only from the inlet/outlet fluid connection port 22 of the fuel cell receiving section 2 to the intermediate waste reservoir 5. The intermediate waste reservoir 5 is fluidly connected to waste outlet 6 via a one-way valve 94 allowing fluid flow only from the intermediate waste reservoir 5 to the waste outlet 6.

The refueling unit comprises further a first piston 41, a second piston 51 and an actuator 7. The first piston 41 is configured to be movable in the intermediate fuel reservoir 4 between a first position (illustrated by the dotted line 43) and a second position (illustrated by the dotted line 42). The second piston 41 is configured to be movable in the intermediate waste reservoir 5 between a first position (illustrated by the dotted line 53) and a second position (illustrated by the dotted line 52). The refuelling unit 1 is configured to receive in the intermediate fuel reservoir 4 a predetermined amount of fuel from the cartridge 31 connected to the cartridge receiving section 3 by moving the first piston 41 from the first position 43 to the second position 42 using the actuator 7, and secondly empty the intermediate fuel reservoir 4 and guide the fuel stored therein out of the inlet/outlet fluid connection port 22 of the fuel cell receiving section 2 by moving the first piston 41 from the second position 42 to the first position 43 using the actuator 7. The refuelling unit 1 is configured to receive in the intermediate waste reservoir 51 a waste fluid from the fuel reservoir 81 of the fuel cell 80 connected to the fuel cell receiving section 2 by moving the second piston 51 from the first position 53 to the second position 52, and secondly empty the intermediate waste reservoir 5 and guide the waste fluid stored therein out of the waste outlet 6 by moving the second piston 51 from the second position 52 to the first position 53.

The first piston 41 may be mechanically coupled to the second piston 51 via a force transferring element so that the first piston 41 and the second piston 51 simultaneously move from the first position 43 53 to the second position 42 52 and from the second position 42 52 to the first position 43 53, whereby the intermediate fuel reservoir 4 is filled with fuel at the same as the intermediate waste reservoir 5 receives waste fluid, and the fuel stored in the intermediate fuel reservoir 4 is guided out of said intermediate fuel reservoir 4 at the same time as the waste fluid is guided out of the intermediate waste reservoir 5.

In one embodiment the one-way valves 91-94 are implemented using a fluid system 90 as described further in relation to FIGS. 3a-e. However, in other embodiments other type of one-way valves may be used.

Figure 3D:
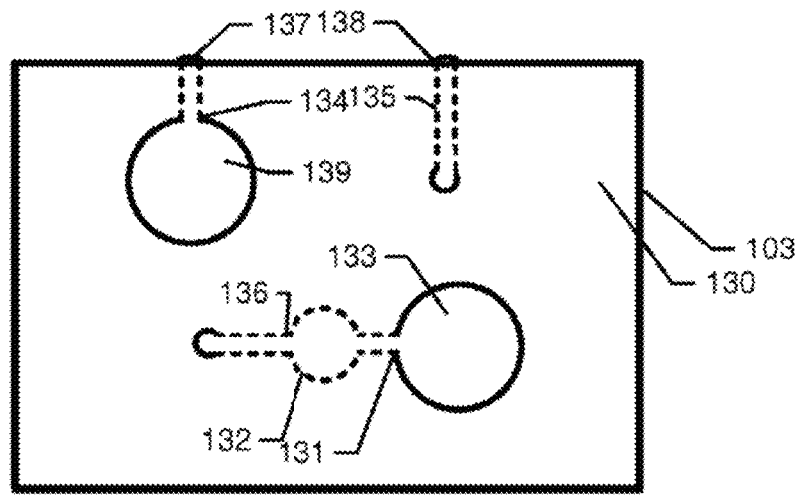
Figure 3E:
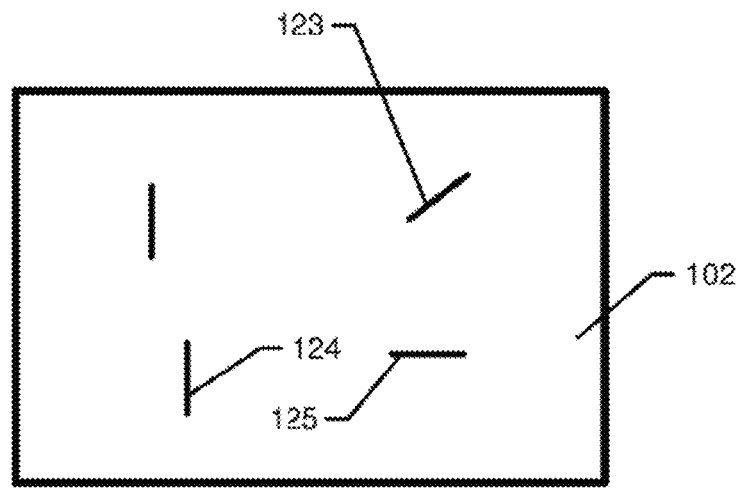

FIGS. 3a-e show a fluid system 100 according to an embodiment of the present invention. The fluid system 100 comprises a first member 101, a membrane sheet 102, and a second member 103. FIG. 3a shows a top view of the fluid system 100, FIG. 3b shows a side view of the fluid system 100, FIG. 3c shows a top view of the first member 101, FIG. 3d shows a bottom view of the second member 103, and FIG. 3e shows a top view of the membrane sheet 102. The first member 101 has a first surface 110, a first inlet/outlet fluid connection port 111, a second inlet/outlet fluid connection port 118, a first flow channel 112, a third flow channel 115, a fifth flow channel 116 and a seventh flow channel 117. The membrane sheet 102 has a first side 121, a second side 122 opposite to said first side 121, a first slit 123, a second slit 124, a third slit 125, and a fourth slit 126. The second member 103 has a first surface 130, a third inlet/outlet fluid connection port 132, a second fluid outlet 137, a third fluid inlet 138, a second flow channel 131, a fourth flow channel 134, a sixth flow channel 135, and an eighth flow channel 136. The first side 121 of the membrane sheet 102 is abutting the first surface 110 of the first member 101 and the second side 122 of the membrane sheet 102 is abutting the first surface 130 of the second member 103. The first flow channel 112 forms a fluid passage from the first inlet/outlet fluid connection port 111 towards the first slit 123, the second flow channel 131 forms a fluid passage from the first slit 123 to the third inlet/outlet fluid connection port 132, the third flow channel 115 forms a fluid passage from the second inlet/outlet fluid connection port 118 towards the second slit 124, the fourth flow channel 134 forms a fluid passage from the second slit 124 to the second fluid outlet 137, the fifth flow channel 116 forms a fluid passage from the third slit 125 to the first inlet/outlet fluid connection port 111, the sixth flow channel 135 forms a fluid passage from the third fluid inlet 138 towards the third slit 125, the seventh flow channel 117 forms a fluid passage from the fourth slit 126 to the second inlet/outlet fluid connection port 118, and the eighth flow channel 136 forms a fluid passage from the third inlet/outlet fluid connection port 132 towards the fourth slit 126. The second member 103 has a first cavity portion 133 forming part of the second flow channel 131, and a second cavity portion 139 forming part of the fourth flow channel 134. The first member 101 has a third cavity portion 150 forming part of the fifth flow channel 116, and a fourth cavity portion 151 forming part of the seventh flow channel 117. The cavity portions 131 139 150 151 are configured to allow said membrane sheet to deform into them whereby the slits 123-126 may be opened.

The fluid system 100 is configured to allow the membrane sheet 102 to deform into the first cavity portion 139 and thereby open the first slit 123 and enable a fluid to flow from the first inlet/outlet fluid connection port 111 to the third inlet/outlet fluid connection port 132 via the first slit 123 when the pressure at the first slit 123 is higher on the first side 121 of the membrane sheet 102 than on the second side 122 of the membrane sheet 102; and wherein the fluid system 100 is further configured to secure that the first slit 123 is substantially closed when the pressure at the first slit 123 is higher on the second side 122 of the membrane sheet 102 than on the first side 121 of the membrane sheet 102.

The fluid system 100 is further configured to allow the membrane sheet 102 to deform into the second cavity portion 134 and thereby open the second slit 124 and enable a fluid to flow from the second inlet/outlet fluid connection port 118 to the second fluid outlet 137 via the second slit 124 when the pressure at the second slit 124 is higher on the first side 121 of the membrane sheet 102 than on the second side 122 of the membrane sheet 102; and wherein the fluid system 100 is further configured to secure that the second slit 124 is substantially closed when the pressure at the second slit 124 is higher on the second side of the membrane sheet 122 than on the first side of the membrane sheet 121.

The fluid system 100 is further configured to allow the membrane sheet 102 to deform into the third cavity portion 150 and thereby open the third slit 125 and enable a fluid to flow from the third fluid inlet 138 to the first inlet/outlet fluid connection port 111 via the third slit 125 when the pressure at the third slit 125 is higher on the second side 122 of the membrane sheet 102 than on the first side 121 of the membrane sheet 102; and wherein the fluid system 100 is further configured to secure that the third slit 125 is substantially closed when the pressure at the third slit 125 is higher on the first side 121 of the membrane sheet 102 than on the second side 122 of the membrane sheet 102.

The fluid system 100 is further configured to allow the membrane sheet 102 to deform into the fourth cavity portion 151 and thereby open the fourth slit 126 and enable a fluid to flow from the third inlet/outlet fluid connection port 132 to second inlet/outlet fluid connection port 118 via the fourth slit 126 when the pressure at the fourth slit 126 is higher on the second side 122 of the membrane sheet 102 than on the first side 121 of the membrane sheet 102; and wherein the fluid system 100 is further configured to secure that the fourth slit 126 is substantially closed when the pressure at the fourth slit 126 is higher on the first side 121 of the membrane sheet 102 than on the second side 122 of the membrane sheet 102.

In the illustrated embodiments, the first member 101 and the second member 103 have different size, i.e. the first member 101 is larger than the second member 103. However, in other embodiments, the second member 103 may be equal to or larger than the first member 101.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A refueling unit for refueling a fuel cell, said refueling unit comprising
   a fuel cell receiving section having a fuel outlet adapted for being fluidly connected to an inlet of a fuel reservoir of a fuel cell, and waste inlet adapted for being fluidly connected to an outlet of said fuel reservoir of said fuel cell;
   a cartridge receiving section having a fuel inlet adapted for being fluidly connected with an outlet of a cartridge comprising a fuel for refuelling said fuel cell;
   wherein said refuelling unit is configured to receive through said waste inlet a waste fluid stored in the fuel reservoir of the fuel cell connected to said fuel cell receiving section,
   wherein said refuelling unit further comprises an intermediate fuel reservoir for storing fuel, said intermediate fuel reservoir being fluidly connected to said fuel inlet of said cartridge receiving section and said fuel outlet of said fuel cell receiving section,
   wherein said refuelling unit is configured to firstly receive in said intermediate fuel reservoir a predetermined amount of fuel from the cartridge connected to said cartridge receiving section and secondly empty said intermediate fuel reservoir and guide said fuel stored therein out of said fuel outlet of said fuel cell receiving section and into the fuel reservoir of the fuel cell connected to said fuel cell receiving section-,
   wherein said refuelling unit further comprises an intermediate waste reservoir and a waste outlet,
   wherein said intermediate waste reservoir is fluidly connected to said waste inlet of said fuel cell receiving section and said waste outlet, and
   wherein said refueling unit is configured to receive the waste fluid through said waste inlet from the fuel reservoir of the fuel cell connected to said fuel cell receiving section by firstly receiving in said intermediate waste reservoir said waste fluid and secondly empty said intermediate waste reservoir and guide said waste fluid stored therein out of said waste outlet.

2. The refueling unit according to claim 1, further comprises a first piston and an actuator;
   wherein said first piston is configured to be movable in said intermediate fuel reservoir between a first position and a second position; and
   wherein said refuelling unit is configured to receive in said intermediate fuel reservoir the predetermined amount of fuel from the cartridge connected to said cartridge receiving section by moving said first piston from said first position to said second position using said actuator, and secondly empty said intermediate fuel reservoir and guide said fuel stored therein out of said fuel outlet of said fuel cell receiving section by moving said first piston from said second position to said first position using said actuator.

3. The refueling unit according to claim 2, wherein said intermediate fuel reservoir is fluidly connected to said fuel inlet of said cartridge receiving section via a one-way valve allowing fluid flow only from said inlet of said cartridge receiving section to said intermediate fuel reservoir.

4. The refueling unit according to claim 2, wherein said intermediate fuel reservoir is fluidly connected to said fuel outlet of said fuel cell receiving section via a one-way valve allowing fluid flow only from said intermediate fuel reservoir to said fuel outlet of said fuel cell receiving section.

5. There fueling unit according to claim 1, further comprising a second piston, wherein said second piston is configured to be movable in said intermediate waste reservoir between a first position and a second position, and wherein said refueling unit is configured to receive in said intermediate waste reservoir the waste fluid from the fuel reservoir of the fuel cell connected to said fuel cell receiving section by moving said second piston from said first position to said second position, and secondly empty said intermediate waste reservoir and guide said waste fluid stored therein out of said waste outlet by moving said second piston from said second position to said first position.

6. The refueling unit according to claim 1, wherein said intermediate waste reservoir is fluidly connected to said waste inlet of said fuel cell receiving section via a one-way valve allowing fluid flow only from said waste inlet to said intermediate waste reservoir.

7. The refueling unit according to claim 1, wherein said intermediate waste reservoir is fluidly connected to said waste outlet via a one-way valve allowing only fluid flow from said intermediate waste reservoir to said waste outlet.

8. The refueling unit according to claim 5, further comprising a first piston and an actuator,
wherein said first piston is configured to be movable in said intermediate fuel reservoir between a first position and a second position,
wherein said refuelling unit is configured to receive in said intermediate fuel reservoir the predetermined amount of fuel from the cartridge connected to said cartridge receiving section by moving said first piston from said first position to said second position using said actuator, and secondly empty said intermediate fuel reservoir and guide said fuel stored therein out of said fuel outlet of said fuel cell receiving section by moving said first piston from said second position to said first position using said actuator, and
wherein said actuator is configured to move said second piston from said first position to said second position, and from said second position to said first position.

9. The refueling unit according to claim 8, wherein said first piston is mechanically coupled to said second piston via a force transferring element so that said first piston and said second piston simultaneously moves from the first position to the second position and from the second position to the first position, whereby the intermediate fuel reservoir is filled with fuel at the same time as the intermediate waste reservoir receives waste fluid, and the fuel stored in the intermediate fuel reservoir is guided out of said intermediate fuel reservoir at the same time as the waste fluid is guided out of said intermediate waste reservoir.

10. The refueling unit according to claim 1, wherein said fuel outlet and said waste inlet of said fuel cell receiving section is combined into a single inlet/outlet fluid connection port for being fluidly connected to a combined inlet/outlet fluid connection port of the fuel reservoir of the fuel cell.

11. A system comprising a refuelling unit according to claim 1 and a hearing aid fitted with a fuel cell having a fuel reservoir with a single combined inlet/outlet fluid connection port connectable to the fuel cell receiving section of the refueling unit.

12. A method of refueling a fuel cell using the refueling unit according to claim 1, comprising the steps of:
arranging a cartridge in said cartridge receiving section of said refueling unit;
arranging a fuel cell having a fuel reservoir in said fuel cell receiving section, said fuel cell forming part of a hearing aid;
receiving in said refueling unit said waste fluid stored in the fuel reservoir of said fuel cell;
receiving in said intermediate fuel reservoir said predetermined amount of fuel from said cartridge connected to said cartridge receiving section;
emptying said intermediate fuel reservoir and guiding said fuel stored therein out of said fuel outlet of said fuel cell receiving section and into the fuel reservoir of said fuel cell connected to said fuel cell receiving section.

* * * * *